United States Patent [19]
Arakawa et al.

[11] Patent Number: 6,105,138
[45] Date of Patent: Aug. 15, 2000

[54] METHOD AND APPARATUS FOR CONTROLLING ELECTRIC SOURCE IN INFORMATION PROCESSING SYSTEM

[75] Inventors: Masami Arakawa, Aichi-ken; Yuji Miyagawa, Owariasahi; Toshiyuki Hosoda, Aichi-ken, all of Japan

[73] Assignees: Hitachi, Ltd., Tokyo; Hitachi Chubu Software, Ltd., Aichi-ken; Hitachi Asahi Electronics Co., Ltd., Owariasahi, all of Japan

[21] Appl. No.: 08/790,795

[22] Filed: Jan. 30, 1997

[30] Foreign Application Priority Data

Jan. 31, 1996 [JP] Japan .................................. 8-014784

[51] Int. Cl.[7] .............................. G06F 1/26; G06F 1/28; G06F 1/30
[52] U.S. Cl. ......................... 713/300; 713/310; 713/340; 713/324; 713/330; 714/15; 714/4; 714/5; 714/22; 307/31; 307/64; 307/66; 365/228; 365/229
[58] Field of Search ......................... 395/750.01, 750.08, 395/182.13, 182.2, 750.2; 307/64, 31, 66; 364/944, 943.91; 365/228, 229; 713/300, 340, 310, 324, 330; 714/15, 22, 4, 5

[56] References Cited

U.S. PATENT DOCUMENTS

| 4,269,489 | 5/1981 | Takimoto | 352/174 |
| 4,458,307 | 7/1984 | McAnlis et al. | 714/22 |
| 5,018,148 | 5/1991 | Patel et al. | 371/66 |
| 5,177,371 | 1/1993 | Faulk | 307/66 |
| 5,212,694 | 5/1993 | Fujiwara | 714/718 |
| 5,212,797 | 5/1993 | Miyake et al. | 395/750 |
| 5,619,077 | 4/1997 | Green et al. | 307/64 |
| 5,640,357 | 6/1997 | Kakimi | 365/229 |
| 5,652,892 | 7/1997 | Ugajin | 395/750 |
| 5,774,044 | 6/1998 | Hayashi | 340/426 |

FOREIGN PATENT DOCUMENTS

| 55-72221 | 5/1980 | Japan . | |
| 56-110117 | 9/1981 | Japan . | |
| 56-166522 | 12/1981 | Japan . | |
| 359202526A | 11/1984 | Japan | G06F 1/00 |
| 406314144A | 11/1994 | Japan | G06F 1/26 |

*Primary Examiner*—Glenn A. Auve
*Assistant Examiner*—Frantz Blanchard Jean
*Attorney, Agent, or Firm*—Beall Law Offices

[57] ABSTRACT

A technique allowing a terminal device located in a remote place to protect data existing on an information processing system and then control an electric source of the information processing system is provided. An information processing system according to the present invention includes a service processor for discriminating an order issued by a terminal device located in a remote place, an electric source control circuit for controlling connection or disconnection of an electric source in response to an electric source connection or disconnection order issued by the service processor, and an electric source unit for conducting connection or disconnection of an electric source in response to an electric source connection or disconnection order issued by the electric source control circuit. The service processor discriminates an electric source disconnection order issued by a terminal device located in a remote place, terminates application software under execution effected by the information processing system, and thereafter orders the electric source control circuit to disconnect the electric source. In response to an order issued by the electric source control circuit, the electric source unit disconnects the electric source. Furthermore, in response to such a state that electric power is supplied from the auxiliary electric source at the time of an electric power failure, shutdown processing is conducted and then the electric source is disconnected. The terminal device located in a remote place is notified that the shutdown processing will be conducted.

25 Claims, 5 Drawing Sheets

| NO. | CURRENT DISSIPATION VALUE | AUXILIARY ELECTRIC SOURCE OPERATION TIME | ELECTRIC SOURCE DISCONNECTION SIGNAL OUTPUT TIME |
|---|---|---|---|
| 1 | 21 - 24A | 18 MIN. | 6 MIN. |
| 2 | 18 - 21A | 20 MIN. | 5 MIN. |
| 3 | 15 - 18A | 25 MIN. | 4 MIN. |
| 4 | 15A | 30 MIN. | 3 MIN. |

METHOD AND APPARATUS FOR CONTROLLING ELECTRIC SOURCE IN INFORMATION PROCESSING SYSTEM

BACKGROUND OF THE INVENTION

The present invention relates to an electric source control system of an information processing system for controlling the information processing system. In particular, the present invention relates to a technique effective when it is applied to an electric source control system of an information processing system having a main electric source and an auxiliary electric source and capable of throwing and cutting an electric source of the information processing system according to an order from a terminal device located in a remote place and connected to the information processing system via a communication line.

To control an electric source in a conventional information processing system, an electric source controller for connecting and disconnecting or throwing and cutting an electric source of the information processing system is provided and the electric source controller is controlled directly by a central processing unit to connect and disconnect the electric source of the information processing system.

As for a technique of this kind, there is described in JP-A-56-166522 a technique for automating the electric source control such as connection and disconnection of an electric source of each device included in an information processing system.

In summary, a system electric source controller has a circuit for generating a power ON signal and a power OFF signal for each device included in the information processing system, and a circuit for generating a first interrupt signal requesting start-up operation and a second interrupt signal requesting start of an information protection program. By sending the power ON signal, the power OFF signal, a ready signal indicating that the device can be used, and an electric source interruption request signal via different signal cables connecting the system electric source controller to respective devices forming a processor and peripheral devices, connection and disconnection of each device forming the information processing system are conducted automatically.

Furthermore, as for a technique concerning the control of a backup electric source at the time of an electric power failure, there is a technique described in JP-A-56-110117.

In summary, devices forming an information processing system are classified into a device group A requiring the power supply even at the time of an electric power failure and a device group B for which suspension of power supply is unavoidable. To devices of the device group B, their electric source is connected without fail via an electric source control circuit. A routine for conducting a task by using only devices of the device group A is incorporated into a CPU as software. At the time of an electric power failure, electric power is supplied to the CPU from a backup electric source. Due to an interrupt conducted by an interrupt generation circuit, the CPU then switches its task to the routine to be used at the time of an electric power failure. In addition, the electric source control circuit stops supply of electric power to the devices belonging to the device group B to reduce the power dissipation of the electric source. Backup of the electric source for a long time is thus effected.

It is now assumed that an electric power failure occurs in the electric source control system of the information processing system using the above described conventional technique and supply of electric power to the information processing system is suspended. Even in the case where electric power can be supplied by a built-in auxiliary electric source at the time of an electric power failure, it is difficult to supply electric power from the auxiliary electric source for a long time. When the capability of electric power supply of the auxiliary electric source has been exhausted, the power supply to the information processing system is suspended. The power supply suspension might be conducted while application software is updating data. This results in a problem of a possibility that important data on the information processing system might be erased or destroyed.

It is assumed again that an electric power failure occurs in the electric source control system of the information processing system using the above described conventional technique and supply of electric power to the information processing system is suspended. Even in the case where electric power can be supplied by a built-in auxiliary electric source at the time of an electric power failure, it cannot be recognized from a terminal device located in a remote place and connected to the information processing system via a communication line that electric power is supplied to the information processing system from the auxiliary electric source. From the terminal device located in the remote place, therefore, it cannot be known that an electric power failure is taking place in the place where the information processing system is installed.

Especially, even when the information processing system is shut down for a reason such as an electric power failure and the electric source turns off, it cannot be grasped in each terminal device that the information processing system cannot continue with processing. Since the situation cannot be grasped on the terminal device side, useless processing and communication for grasping the situation and attempting to start the information processing system are conducted, resulting in a lowered operational efficiency of the system.

Furthermore, the case where recovery from the electric power failure takes place in a short time is also conceivable. Therefore, it is not desirable to start the shutdown processing immediately upon occurrence of an electric power failure.

On the other hand, even if an electric power failure does not occur, it is difficult for a terminal device located in a remote place to know the state of application software which is being executed in the information processing system. While the application software is updating data in the information processing system, therefore, the electric source might be disconnected in the information processing system according to an order issued by a terminal device. Thus there is a possibility that important data on the information processing system might be erased or destroyed.

If control for turning off the electric source of the information processing system is effected by a terminal device located in a remote place, then there is a fear that the data destruction as described above might occur. According to the above described conventional technique, however, it is possible for a terminal device to connect or disconnect the electric source to the information processing system easily.

Furthermore, in the case where the control for turning on and off the electric source is effected by the central processing unit itself as in the conventional technique, it might be disadvantageously disabled to control the electric source or give a notice to a terminal device by a failure of the central processing unit or occurrence of a processing suspension state of the central processing unit caused by application software operating in the central processing unit.

SUMMARY OF THE INVENTION

An object of the present invention is to provide an information processing system solving the above described problems and having an improved electric source controlling function.

Another object of the present invention is to provide an information processing system capable of protecting data under processing even when an electric power failure occurs.

Another object of the present invention is to provide an information processing system capable of protecting data at the time of occurrence of an electric power failure and improving the operational efficiency of the system by suppressing the occurrence rate of the shutdown processing of the information processing system to a low value.

A further object of the present invention is to provide an information processing system capable of giving a notice of shutdown of the information processing system to a processor such as a personal computer located in a remote place (hereafter referred to as a terminal device).

A further object of the present invention is to provide a technique making it possible to control an electric source of an information processing system after protecting data existing on the information processing system even in the case where the electric source is controlled by a terminal device located in a remote place.

The above described and other objects and novel features of the present invention will be apparent from the description of the present specification and attached drawing.

Representative aspects of the present invention will be hereafter described briefly.

In accordance with the present invention, an information processing system has a main electric source for supplying power to the information processing system and an auxiliary electric source for supplying power to the information processing system when power supply from the main electric source is stopped. When an electric power failure has occurred, switching to the auxiliary electric source, terminating application software in the middle of operation, causing data protection processing (shutdown processing) to be conducted, and terminating the supply of power are effected in the cited order. Even if the electric power failure time is prolonged, therefore, data protection can be certainly conducted.

Furthermore, after switching to the auxiliary electric source, the shutdown processing is not conducted immediately but conducted when necessary and sufficient remaining time has been reached. In the case of an electric power failure lasting for a short time, therefore, switching to the normal operation using the main electric source can be effected. It is thus possible to prevent useless shutdown processing and improve the operational efficiency of the system.

Furthermore, from a current value now in use, a time required for the shutdown processing is derived. The time during which the shutdown processing is executed is thus changed. When the required time is short, the shutdown processing and the electric source turning off time are delayed. By thus dynamically changing the time period of operation using the auxiliary electric source according to the operation environment and operation mode of the information processing system and delaying the electric source turning off time to the very limit, it is possible to prevent useless shutdown processing and improve the operational efficiency of the system.

Before conducting the above described shutdown processing, a notice is given to a terminal device to inform the user of the terminal device of the shutdown. It is thus possible to urge the user to take some appropriate countermeasure such as suspension of application software and advanced termination of application software under execution.

Furthermore, even in the case where the information processing system is ordered to turn off the electric source by a terminal device, terminal devices capable of ordering the information processing system to turn off the electric source can be specified. Thereby, it becomes possible to exclude inexperienced operators and unauthorized operators from processing of the electric source. Thus, it becomes possible to reduce unprepared electric source turning off processing and improve the operational efficiency of the system.

Such electric source control can be executed by a service processor different from the central processing unit of the information processing system. Thereby, the electric source control can be effected even when the central processing unit cannot operate.

The service processor monitors a failure in the central processing unit and notifies a terminal device of the failure in the central processing unit. It is possible to find on the terminal device side that a trouble has been caused by a failure in the CPU. Since the grasp of the situation is thus possible on the terminal device side, unnecessary communication processing can be suppressed, resulting in an improved effect of effective operation of the system. Furthermore, since the grasp of the failure is thus possible on the terminal device side, the recovery time can also be shortened.

In the electric source control system of the above described information processing system, an auxiliary electric source monitoring circuit which has outputted an auxiliary electric source operation signal to the service processor checks up the output voltage of the auxiliary electric source supplying electric power to the information processing system upon suspension of supply of power from the main electric source and monitors the current dissipation.

It is now assumed that the correlative relation between the output voltage of the auxiliary electric source and its current dissipation has been obtained beforehand and its current dissipation can be known by checking up the output voltage.

BRIEF DESCRIPTION OF THE DRAWING

In FIG. 1, 1 denotes a terminal device, 2 an information processing system, 3 a service processor, 3A an instruction discriminator, 3B a memory, 3-1 an electric source connection/disconnection order signal, 4 an electric source control circuit, 4-1 an electric source ON/OFF signal, 5 an electric source switch, 5-1 a pulse, 6 a main electric source, 6-1 an AC disconnection signal, 7 an auxiliary electric source, 7-1 output voltage, 8 an auxiliary electric source monitoring circuit, 8-1 an auxiliary electric source operation signal, 8-2 an electric source disconnection signal, 9 a real time clock, 10 a modem, 11 a central processing unit, 12 a main memory, 12A an operating system, 12B application software, 13 an external memory, and 13A a file.

DESCRIPTION OF THE PREFERRED EMBODIMENT

Hereafter, the present invention will be described in detail by referring to an embodiment and the drawing. Throughout the drawings for illustrating the embodiment, components having the same functions are denoted by like characters and repeated description thereof will be omitted.

In an embodiment of an electric source control system of an information processing system according to the present invention which will be hereafter described, the electric source of the information processing system is controlled from a terminal device located in a remote place, a terminal device located in a remote place is notified of the operation of an auxiliary electric source at the time of an electric power failure, and the operation of the information processing system is stopped when a specific period of time has elapsed.

Figure 1:
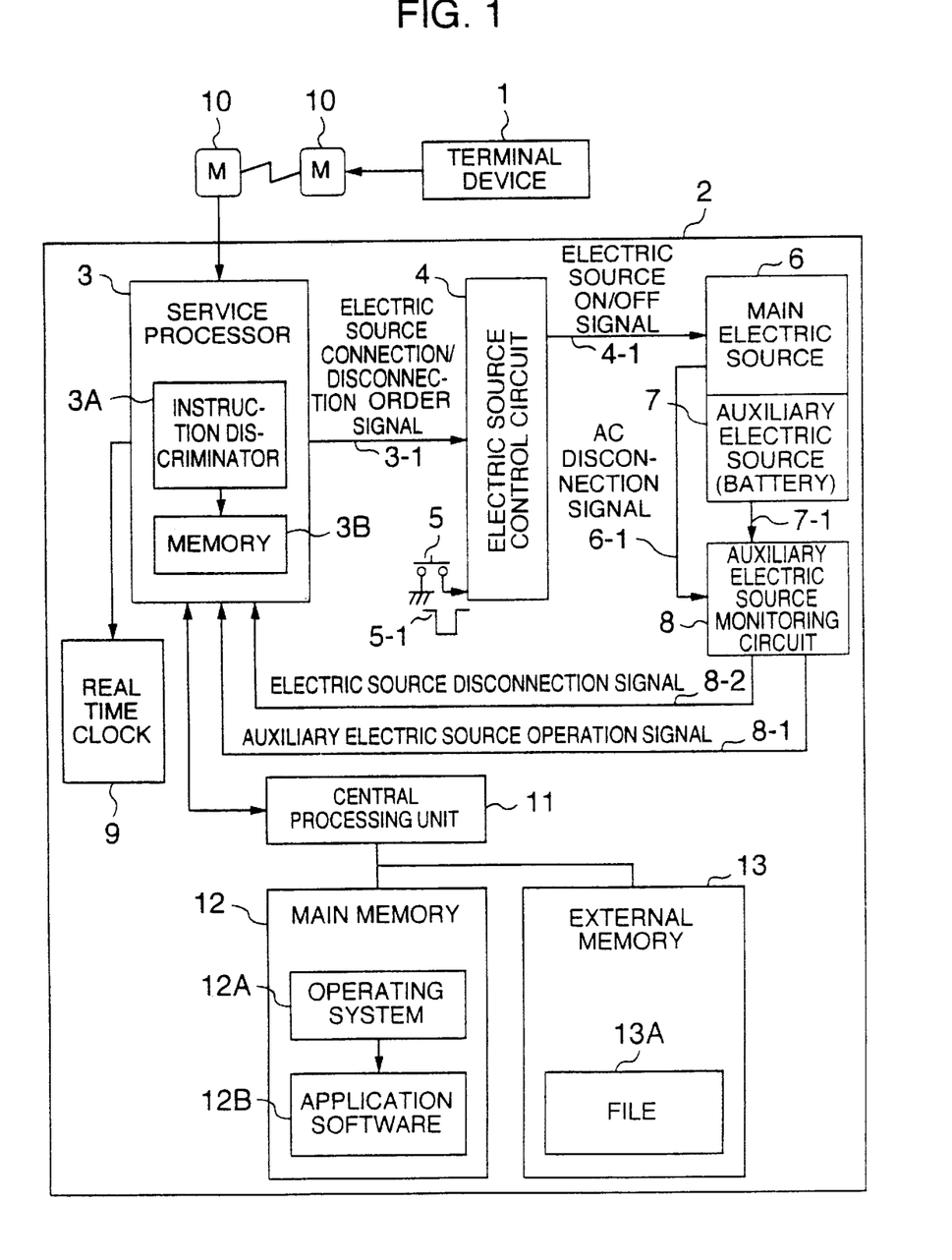
FIG. 1 is a diagram showing the schematic configuration of an embodiment of an electric source control system of an information processing system according to the present invention.

In the electric source control system of the information processing system of the present embodiment, the terminal device 1 is remotely connected to the information processing system 2 via a modem 10 for the terminal device 1, a communication line, and a modem 10 for the information processing system 2.

The information processing system 2 includes a service processor 3 for discriminating an order from the terminal device 1 located in a remote place and connected to the information processing system via the communication line, an electric source control circuit 4 for controlling the connection or disconnection, i.e., throwing or cutting of an electric source according to an electric source connection or disconnection order from the service processor 3, an electric source switch 5 for ordering the electric source control circuit 4 to connect or disconnect a main electric source 6 according to a manual operation of an operator, main electric source 6 which is capable of connecting or disconnecting the electric source according to the electric source connection or disconnection order from the electric source control circuit 4, an auxiliary electric source 7 functioning as an electric source of the information processing system 2 at the time of an electric power failure, an auxiliary electric source monitoring circuit 8 for monitoring the operation of the auxiliary electric source 7, and a real time clock 9 indicating the current time.

Furthermore, the information processing system 2 includes a central processing unit 11, a main memory 12, and an external memory 13. The information processing system 2 executes application software 12B under the control of the operating system 12A and accesses a file 13A located on an external memory 13.

In the service processor 3 of the information processing system 2, an instruction discriminator 3A and a memory 3B are incorporated. The service processor 3 discriminates an instruction sent from the terminal device 1 located in the remote place and connected via the communication line by using the instruction discriminator and executes the instruction.

In the case where the above described discriminated instruction is an instruction requiring check using a password or an instruction setting the time for controlling the main electric source 6, the service processor 3 retrieves information concerning the password stored in the memory 3B and sets the disconnection time of the main electric source 6 into the memory 3B.

The discrimination and execution of the instruction sent from the terminal device 1 located in the remote place as conducted by the instruction discriminator 3A of the service processor 3 can be implemented as software processing.

The service processor 3 is a processor which is independent of the central processing unit 11. The service processor monitors occurrence of an abnormality such as a failure of the central processing unit. When a failure which cannot be judged by the central processing unit such as a failure of the central processing unit has occurred, the service processor 3 determines the kind of the detected abnormality and notifies the terminal device 1 connected via the communication line of the occurrence of the abnormality and its kind.

In the present embodiment, the service processor 3 separated from the central processing unit has the function of the electric source control as well. Even when a failure has occurred in the central processing unit, the electric source control can be thus effected according to an electric source ON/OFF order from a terminal device. Furthermore, since a terminal device can be notified of the kind of failure, appropriate action depending upon the failure can be taken on the terminal device side.

On the basis of an electric source connection/disconnection order signal 3-1 from the service processor 3 and a pulse 5-1 obtained when the electric source switch 5 is depressed, the electric source control circuit 4 outputs an electric source ON/OFF signal 4-1 to the main electric source 6.

On the basis of the electric source ON/OFF signal 4-1 supplied from the electric source control circuit 4, the main electric source 6 of the information processing system 2 connects or disconnects the electric source. The auxiliary electric source 7, including batteries, backs up the electric source of the information processing system 2 when an electric power failure has occurred in the commercial electric source.

In the case where electric power is being supplied from the auxiliary electric source 7 at the time of an electric power failure, an auxiliary electric source monitoring circuit 8 of the information processing system 2 outputs an auxiliary electric source operation signal 8-1 to the service processor 3.

When power is supplied from the auxiliary electric source 7 at the time of an electric power failure, the auxiliary electric source monitoring circuit 8 of the information processing system 2 monitors the current dissipation by watching the value of output voltage 7-1 of the auxiliary electric source 7, and determines the operable time of the auxiliary electric source 7 corresponding to the load on the basis of the value of the current dissipation. When the operable time in the auxiliary electric source 7 has become a certain fixed time, the auxiliary electric source monitoring circuit 8 outputs an electric source disconnection signal 8-2 to the service processor 3.

Figure 5:
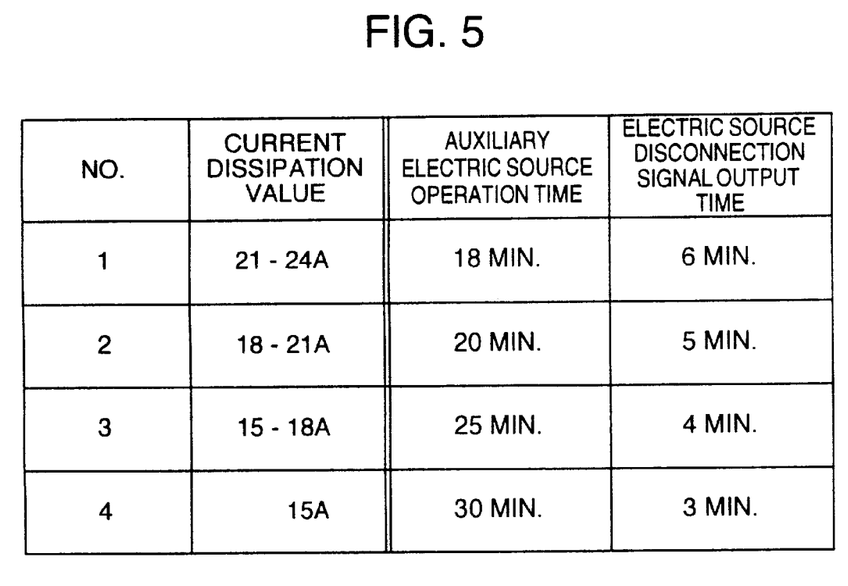
FIG. 5 is TABLE 1 exemplifying the operation time in the auxiliary electric source 7 and the output time of the electric source disconnection signal 8-2 determined by the current dissipation value of the output voltage 7-1 in the auxiliary electric source 7 of the information processing system of the present embodiment.

FIG. 5 shows TABLE 1 exemplifying the operation time in the auxiliary electric source 7 and the output time of the electric source disconnection signal 8-2 determined by the current dissipation value of the output voltage 7-1 of the auxiliary electric source 7 in the electric source control system of the information processing system of the present embodiment. In TABLE 1 shown in FIG. 5, the auxiliary electric operation time indicates the time during which the auxiliary electric source 7 can operate with a corresponding current dissipation value. The electric source disconnection signal output time indicates the remaining operable time of the auxiliary electric source 7 at which output of the electric source disconnection signal 8-2 is started. Time which has elapsed from the time when the auxiliary electric source 7 started its operation is subtracted from the above described auxiliary electric source operation time. When the remaining time has become the above described electric source disconnection signal output time or less, the electric source disconnection signal 8-2 is outputted to the service processor 3.

For example, if the auxiliary electric source 7 starts its operation with a current dissipation value ranging from 21 A to 24 A, the time period length during which the auxiliary electric source 7 can operate is 18 minutes. When the remaining time during which the auxiliary electric source 7 can operate has become 6 minutes or less, the electric source disconnection signal 8-2 is outputted to the service processor 3.

In the electric source control system of the information processing system of the present invention, the auxiliary electric source operation time representing the time period during which the auxiliary electric source can operate is set to a short period of time in the case where the current dissipation value is large and the load of the auxiliary electric source is heavy as shown in TABLE 1. Furthermore, according to the current dissipation value of the auxiliary electric source 7, the electric source disconnection signal output time is set to a long value and the electric source disconnection signal 8-2 is outputted to the service processor 3 earlier. This assures the time required since the electric source disconnection signal 8-2 has been received by the service processor 3 until the central processing unit 11, the operating system 12A, and the application software 12B are notified that the electric source will be disconnected and data stored in the file 13A of the external memory 13 are protected. It can be empirically judged that a large current dissipation is caused by a large amount of data bringing about a large number of disks in use or a large number of times of access to those disks. Therefore, it takes a longer time to conduct the shutdown processing such as terminating an application program since issuance of the electric source disconnection signal. Therefore, advancing the output time of the electric source disconnection signal when the current dissipation value is large is helpful in delaying the recovery from an electric power failure to the very limit while conducting the shutdown processing certainly to eliminate unnecessary shutdown processing and improve the operational efficiency of the system.

Figure 2:
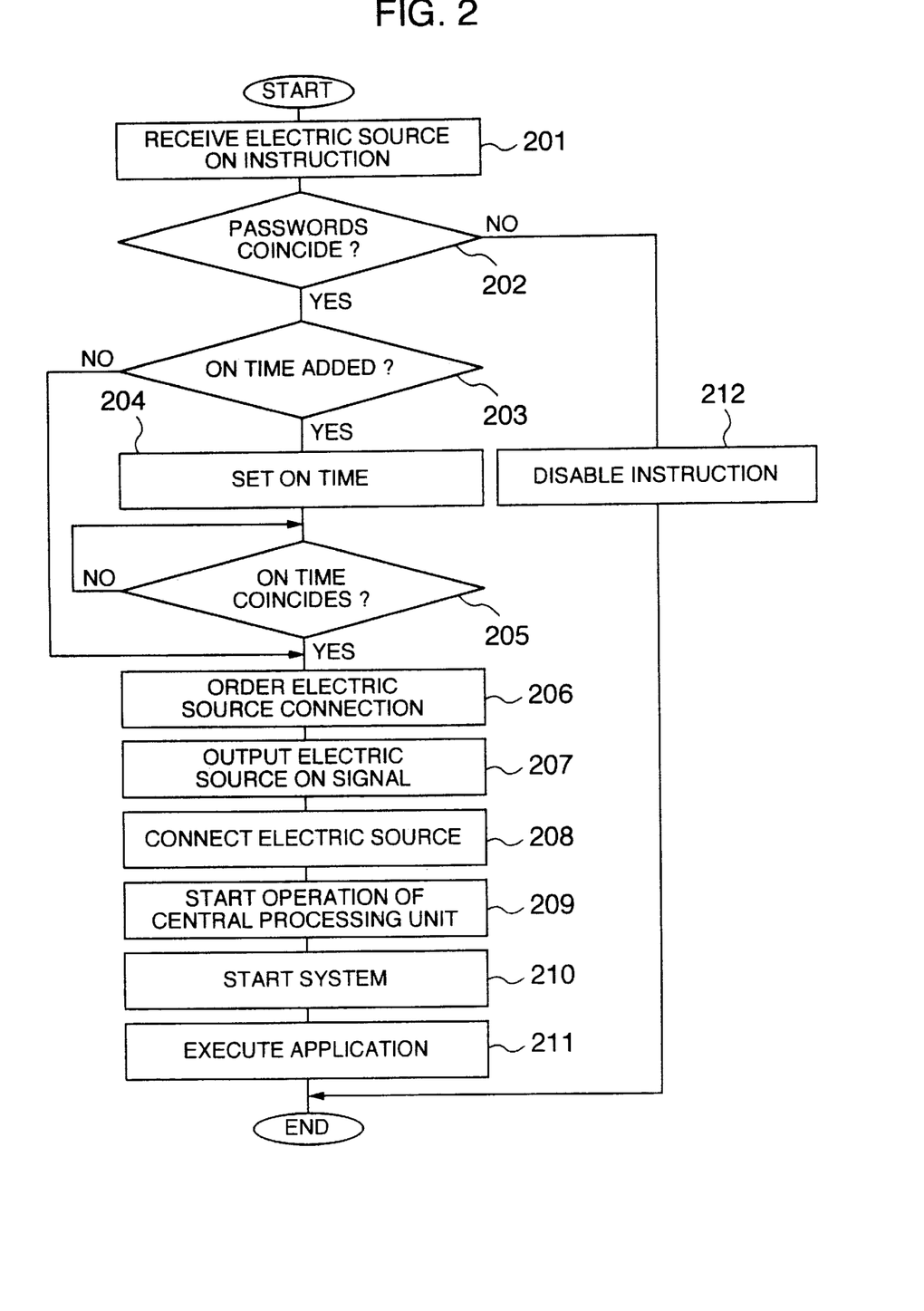
FIG. 2 is a flow chart showing the processing procedure of processing conducted to connect the electric source of the information processing system in response to an order from a terminal device located in a remote place in the electric source control system of the information processing system of the present embodiment.

Hereafter, a processing procedure used in the electric source control system of the information processing system of the present embodiment to connect the electric source of the information processing system 2 from the terminal device 1 located in a remote place will be described.

In the electric source control system of the information processing system of the present embodiment, data including an instruction for connecting the electric source of the information processing system 2 are transmitted from the terminal device 1 located in a remote place to the information processing system 2 via modems connected respectively to the terminal device 1 and the information processing system 2 and the communication line. By conducting processing of step 201, the service processor 3 receives data sent from the terminal device 1 located in the remote place as shown in FIG. 2.

Upon receiving the data sent from the terminal device 1 located in the remote place, the service processor 3 discriminates contents of a received instruction by using the instruction discriminator 3A included in the service processor 3.

If the instruction discriminated by the instruction discriminator 3A included in the service processor 3 is an electric source ON instruction for connecting the electric source of the information processing system 2, a password contained in the data sent from the terminal device 1 located in the remote place is first compared by processing conducted at step 202 with a password registered beforehand in the memory 3B in the service processor 3 to determine whether they coincide with each other.

By processing conducted at step 202, the password contained in the data sent from the terminal device 1 is compared with the password registered beforehand in the memory 3B in the service processor 3 as described above. If, as a result, the password sent from the terminal device 1 coincides with the password registered in the memory 3B of the service processor 3, then processing proceeds to step 203 and processing for connecting the electric source of the information processing system 2 is started. If the password sent from the terminal device 1 does not coincide with the password registered in the service processor 3, then processing proceeds to step 212 to disable the electric source ON instruction for connecting the electric source of the information processing system 2 and processing is finished.

By processing conducted at the step 203, it is determined whether an ON time for specifying the time connecting the electric source of the information processing system 2 has been added to the data sent from the terminal device 1. If the ON time has been added to the data sent from the terminal device 1, then processing proceeds to step 204.

By processing conducted at step 204, the ON time of the electric source of the information processing system 2 sent from the terminal device 1 is set in the memory 3B in the service processor 3 and processing proceeds to step 205.

By processing conducted at step 205, the ON time of the electric source of the information processing system 2 set in the memory 3B of the service processor 3 is compared with time indicated by the real time clock 9. If the ON time of the electric source of the information processing system 2 sent from the terminal device 1 coincides with the time indicated by the real time clock 9, processing proceeds to step 206.

By the processing conducted at the step 203, it is checked whether the ON time for connecting the electric source to the information processing system 2 has been added to the data sent from the terminal device 1 as described above. Even if, as a result, the ON time has not been added to the data sent from the terminal device 1, processing proceeds to the step 206.

By processing conducted at the step 206, the service processor 3 outputs the electric source connection/disconnection order signal 3-1 to the electric source control circuit 4 to order the electric source control circuit 4 to connect the electric source.

Upon receiving the electric source connection order in the form of the electric source connection/disconnection order signal 3-1 supplied from the service processor 3, the electric source control circuit 4 outputs an electric source ON signal to the main electric source 6 in the form of the electric source ON/OFF signal 4-1 by conducting processing of step 207 and thereby orders the main electric source 6 to connect the electric source.

Upon receiving the electric source connection order in the form of the electric source ON/OFF signal 4-1 supplied from the electric source control circuit 4, the main electric source 6 connects the electric source by conducting the processing of the step 207 and starts supply of power from the main electric source 6.

If supply of power from the main electric source 6 is started, operation of the central processing unit 11 is started by processing of step 209. By processing conducted at step 210, software such as the operating system 12A is loaded into the main memory 12 by system start processing and thereafter the operating system 12A is started.

The operating system 12A, which has started execution by conducting the system start processing, determines whether there is the application software 12B to be executed after termination of the system start processing. If there is application software 12B to be executed after the system start, the operating system 12A starts the application software 12B.

Figure 3:
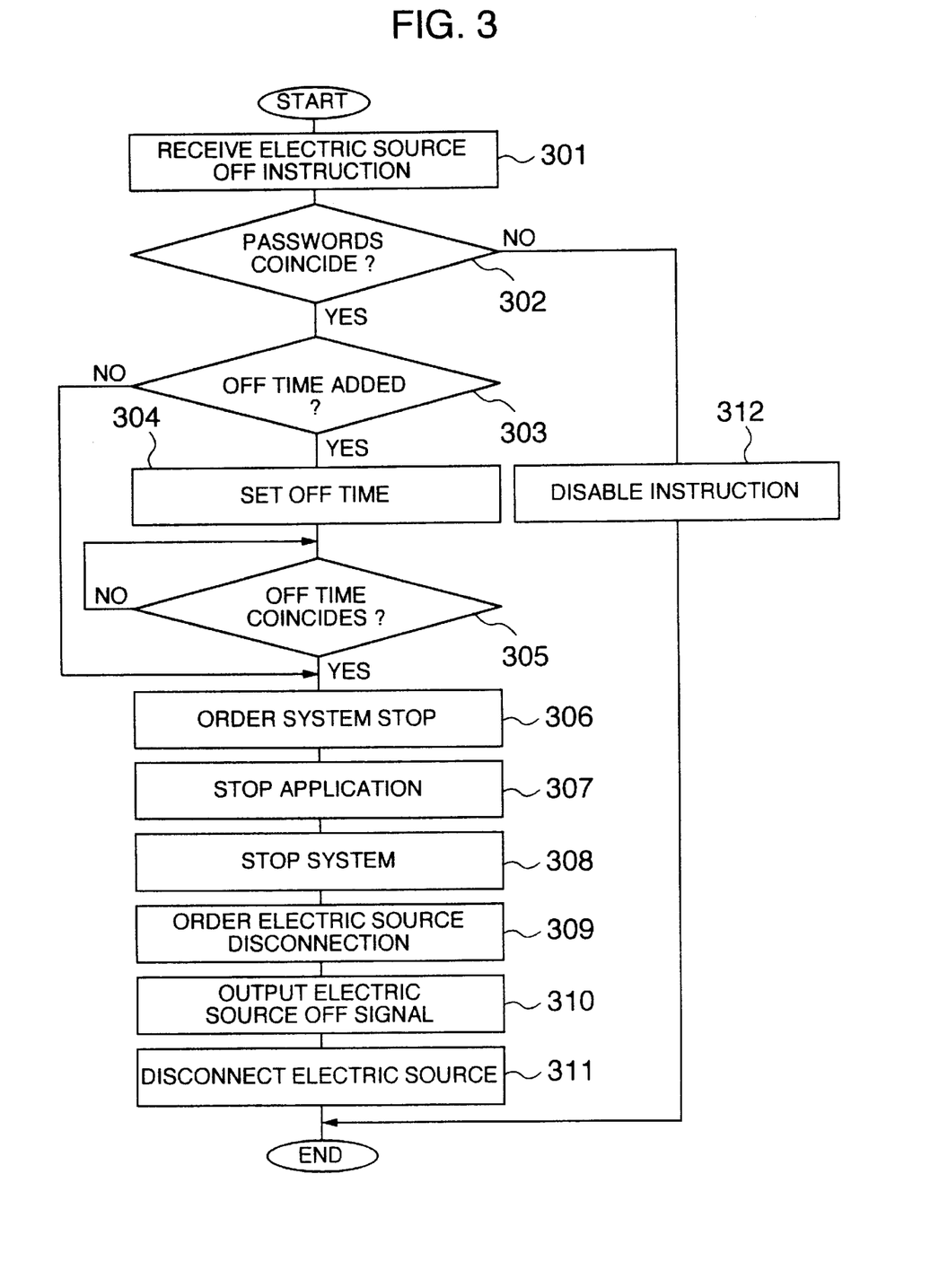
FIG. 3 is a flow chart showing the processing procedure of processing conducted to disconnect the electric source of the information processing system in response to an order from a terminal device located in a remote place in the electric source control system of the information processing system of the present embodiment.

Hereafter, a processing procedure used in the electric source control system of the information processing system of the present embodiment to disconnect the electric source of the information processing system 2 from the terminal device 1 located in a remote place will be described.

In the electric source control system of the information processing system of the present embodiment, data including an instruction for disconnecting the electric source of the information processing system 2 are transmitted from the terminal device 1 located in a remote place to the information processing system 2 via modems connected respectively to the terminal device 1 and the information processing system 2 and the communication line. By conducting processing of step 301, the service processor 3 receives data sent from the terminal device 1 located in the remote place as shown in FIG. 2.

Upon receiving the data sent from the terminal device 1 located in the remote place, the service processor 3 discriminates contents of a received instruction by using the instruction discriminator 3A included in the service processor 3.

If the instruction discriminated by the instruction discriminator 3A included in the service processor 3 is an electric source OFF instruction for disconnecting the electric source from the information processing system 2, a password contained in the data sent from the terminal device 1 located in the remote place is first compared by processing conducted at step 302 with a password registered beforehand in the memory 3B in the service processor 3 to determine whether they coincide with each other.

By processing conducted at step 302, the password contained in the data sent from the terminal device 1 is compared with the password registered beforehand in the memory 3B in the service processor 3 as described above. If, as a result, the password sent from the terminal device 1 coincides with the password registered in the memory 3B of the service processor 3, then processing proceeds to step 303 and processing for disconnecting the electric source from the information processing system 2 is started. If the password sent from the terminal device 1 does not coincide with the password registered in the service processor 3, then processing proceeds to step 312 to disable the electric source OFF instruction for disconnecting the electric source from the information processing system 2 and processing is finished.

By processing conducted at the step 303, it is determined whether an OFF time specifying the time for disconnecting the electric source of the information processing system 2 has been added to the data sent from the terminal device 1. If the OFF time has been added to the data sent from the terminal device 1, then processing proceeds to step 304.

By processing conducted at step 304, the OFF time of the electric source of the information processing system 2 sent from the terminal device 1 is set in the memory 3B in the service processor 3 and processing proceeds to step 305.

By processing conducted at step 305, the OFF time of the electric source of the information processing system 2 set in the memory 3B of the service processor 3 is compared with time indicated by the real time clock 9. If the OFF time of the electric source of the information processing system 2 sent from the terminal device 1 coincides with the time indicated by the real time clock 9, processing proceeds to step 306.

By the processing conducted at the step 303, it is checked whether the OFF time for disconnecting the electric source from the information processing system 2 has been added to the data sent from the terminal device 1 as described above. Even if, as a result, the OFF time has not been added to the data sent from the terminal device 1, processing proceeds to the step 306.

By processing conducted at the step 306, the service processor 3 orders the central processing unit 11 to stop the system. Upon receiving the system stop order from the service processor 3, the central processing unit 11 orders the operating system 12A to stop the application software 12B under execution.

Upon receiving the order stopping the application software 12B under execution from the central processing unit 11, the operating system 12A conducts interruption into the application software 12B under execution by conducting processing of step 307. In order to protect data, the operating system 12A orders the application software 12B to suspend the execution after input/output processing with respect to the file 13A on the external memory 13 has been finished.

If the execution of all application software 12B has been finished, the operating system 12A finishes the execution of the operating system 12A itself and stops the system by conducting processing of step 308.

If the execution of the operating system 12A is finished and the system is stopped, then the service processor 3 outputs the electric source connection/disconnection order signal 3-1 to the electric source control circuit 4 to order disconnection of the electric source at step 309.

Upon receiving the electric source disconnection order in the form of the electric source connection/disconnection order signal 3-1 supplied from the service processor 3, the electric source control circuit 4 outputs an electric source ON/OFF signal 4-1 to the main electric source 6 to order the main electric source 6 to disconnect the electric source by conducting processing of step 310. Upon receiving the electric source disconnection order in the form of the electric source ON/OFF signal 4-1 supplied from the electric source control circuit 4, the main electric source 6 stops supply of power from the main electric source 6 by conducting processing of step 311.

It is now assumed in the electric source control system of the information processing system of the present embodiment that supply of power from the main electric source 6 has been stopped because of an electric power failure in the information processing system 2. At this time, a terminal device located in a remote place is notified of the operation of the auxiliary electric source 7. After a specific time has elapsed, the operation of the information processing system is stopped. Hereafter, this procedure will be described.

It is now assumed that an electric power failure has occurred in the electric source control system of the information processing system of the present embodiment during operation of the information processing system 2. At this time, the auxiliary electric source 7 of the information processing system 2 detects occurrence of the electric power failure by conducting processing of step 401 as shown in FIG. 3. By processing of step 402, supply of power from the auxiliary electric source 7 to the information processing system 2 is started.

By receiving an AC disconnection signal 6-1 fed from the main electric source 6 at step 403, the auxiliary electric source monitoring circuit 8 finds that supply of power from the main electric source 6 is stopped due to occurrence of an electric power failure or the like and electric power is being supplied from the auxiliary electric source 7. The auxiliary electric source monitoring circuit 8 thus outputs the auxiliary electric source operation signal 8-1 to the service processor 3.

Upon receiving the auxiliary electric source operation signal 8-1 fed from the auxiliary electric source monitoring circuit 8, the instruction discriminator 3A of the service processor 3 determines that the auxiliary electric source 7 has started its operation at step 404. The service processor 3 then notifies a terminal device 1 located in a remote place and connected via modems 10 and a communication line that an electric power failure has occurred during the operation of the information processing system 2 and that the auxiliary electric source 7 is operating.

When an electric power failure occurs during the operation of the information processing system 2 and the auxiliary electric source 7 has started its operation, the electric source control system of the information processing system of the present embodiment causes the terminal device 1 located in the remote place to be notified via the modems 10 and the communication line that the auxiliary electric source 7 has started its operation. Therefore, it is possible to monitor the electric source state of the information processing system 2 from the terminal device 1 located in the remote place.

After the auxiliary electric source monitoring circuit 8 outputs the auxiliary electric source operation signal 8-1 to the service processor 3 at step 403, the auxiliary electric source monitoring circuit 8 checks up the output voltage 7-1 of the auxiliary electric source 7 supplying electric power at the time of an electric power failure and monitors its current dissipation at step 405.

It is now assumed that the correlative relation between the output voltage 7-1 of the auxiliary electric source 7 and its current dissipation was derived beforehand and it is possible to know the current dissipation by checking up the output voltage 7-1.

By conducting processing of step 406, the auxiliary electric source operable time representing the time during which the auxiliary electric source 7 can operate and corresponding to the load of its current dissipation is determined by referring to TABLE 1 on the basis of the value of the current dissipation of the auxiliary electric source 7 derived by the processing of the step 405.

By conducting processing of step 406, the electric source disconnection signal output time corresponding to the load of the current dissipation is also derived by referring to TABLE 1 on the basis of the value of the current dissipation of the auxiliary electric source 7 derived by the processing of the step 405. The electric source disconnection signal output time indicates the remaining operable time of the auxiliary electric source 7 at which output of the electric source disconnection signal 8-2 is started.

By conducting processing of step 407, it is determined whether the remaining operable time with the auxiliary electric source 7 has reached the electric source disconnection signal output time specified in TABLE 1. If the remaining operable time with the auxiliary electric source 7 has reached the electric source disconnection signal output time derived by the processing of the step 406, then processing proceeds to step 408 and processing for stopping the operation of the information processing system 2 is started.

If a recovery from the electric power failure is effected during the waiting time of the step 407 and supply of electric power from the main electric source becomes possible, the source of supply of electric power is switched to the main electric source 6 and the normal operation is restored. Processing is thus finished.

By conducting processing of step 408, the auxiliary electric source monitoring circuit 8 outputs the electric source disconnection signal 8-2 to the service processor 3 and thereby orders the service processor 3 to stop the operation of the information processing system 2 using the auxiliary electric source 7.

Upon receiving the electric source disconnection signal 8-2 from the auxiliary electric source monitoring circuit 8, the service processor 3 orders the central processing unit 11 to stop the system by conducting processing of step 409. Upon receiving the system stopping order from the service processor 3, the central processing unit 11 orders the operating system 12A to stop the application software under execution.

Upon receiving the order stopping the application software 12B under execution from the central processing unit 11, the operating system 12A interrupts the application software 12B under execution by conducting processing of step 410. In order to protect data, the operating system 12A orders the application software 12B to suspend the execution of the application software 12B after input/output processing with respect to the file 13A on the external memory 13 has been finished.

If the execution of all application software 12B has been finished, the operating system 12A finishes the execution of the operating system 12A itself and stops the system by conducting processing of step 411.

If the execution of the operating system 12A is finished and the system is stopped, then the service processor 3 orders the electric source control circuit 4 to stop the supply of electric power from the auxiliary electric source 7 at step 412 by using the electric source connection/disconnection order signal 3-1.

Upon receiving the electric source stopping order in the form of the electric source connection/disconnection order signal 3-1 supplied from the service processor 3, the electric source control circuit 4 orders electric source disconnection with the electric source ON/OFF signal 4-1 by conducting processing of step 413. Upon being ordered to disconnect the electric source by the electric source control circuit 4 in the form of the electric source ON/OFF signal 4-1, the main electric source 6 stops the supply of electric power from the auxiliary electric source 7 and stops the operation of the information processing system 2 by conducting processing of step 414.

In the electric source control system of the information processing system of the present embodiment, the electric source of the information processing system 2 is controlled under the order of the terminal device 1 connected thereto via a communication line and located in a remote place as described above. At the time of an electric power failure, data protection is effected and then automatic stopping is conducted. Thereby, the information processing system 2 can be made unattendant in operation and it can be administered remotely. Therefore, the information processing system 2 can be administered in diverse running forms.

In the case where the electric source of the information processing system is to be disconnected, the electric source control system of the information processing system of the present embodiment causes application software under execution to be stopped and then causes the service processor to issue an order for disconnection of the electric source to the electric source control circuit as heretofore described. In the case where the electric source of the information processing system is controlled from a terminal device located in a remote place, therefore, it is possible to protect data existing on the information processing system and thereafter control the electric source.

In the case where supply of electric power from the main electric source stops during operation of the information processing system and the auxiliary electric source starts its operation, the electric source control system of the information processing system of the present embodiment notifies the terminal device located in .he remote place via the modems and the communication line that the auxiliary electric source has started its operation. Therefore, it is possible to monitor the electric source state of the information processing system from the terminal device located in the remote place.

Furthermore, in the case where electric power is supplied from the auxiliary electric source, the electric source control system of the information processing system of the present embodiment causes application software under execution to be stopped before all of the electric power supplying capability of the auxiliary electric source is exhausted. In the case where supply of electric power from the main electric source is stopped and the auxiliary electric source is operating, therefore, it is possible to protect data existing on the information processing system and stop the operation of the information processing system before the operation of the auxiliary electric source stops.

Heretofore, the present embodiment has been described concretely on the basis of the above described embodiment. However, it is a matter of course that the present invention is not limited to the above described embodiment, but various modifications can be made in a scope which does not depart from the spirit.

For example, in the electric control system of the information processing system of the present embodiment, checking using a password is effected when an instruction for connecting or disconnecting the electric source of the information processing system 2 is received from the terminal device 1 located in the remote place. Also when a different instruction sent from the terminal device located in the remote place is received, however, checking using a password may be effected.

Figure 4:
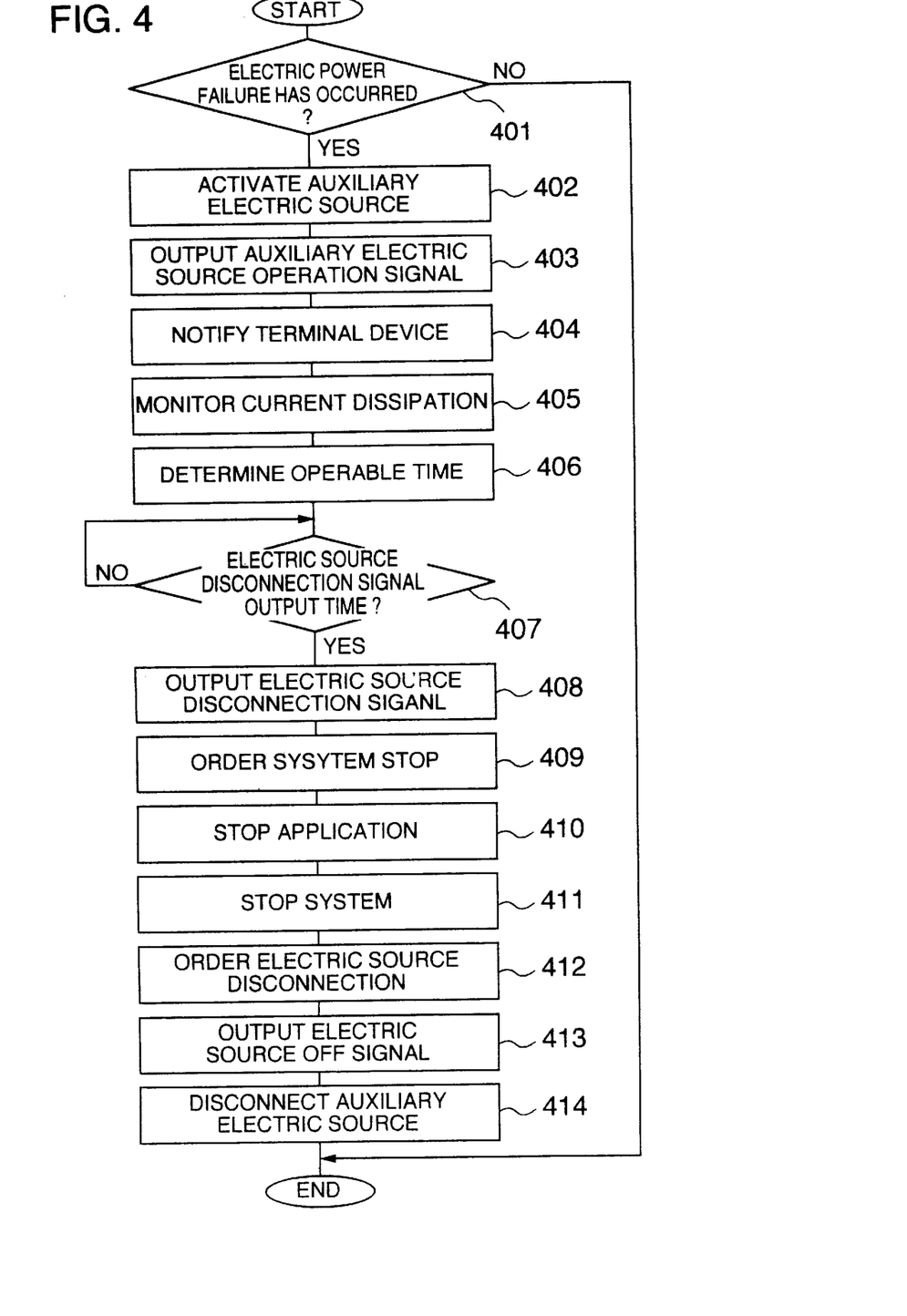
FIG. 4 is a flow chart showing the processing procedure of processing conducted, upon occurrence of an electric power failure in the electric source control system of the information processing system of the present embodiment, to notify the terminal device located in the remote place that the auxiliary electric source has been actuated and stop the operation of the information processing system.

In a different embodiment of an electric control system according to the present invention, it is possible to input program codes shown in the flow charts of FIGS. 2 through 4 and conduct the electric source control operation in the above described sequence according to an instruction from a terminal device 1 located in a remote place. The program codes may be inputted from any terminal device, or may be inputted from a recording medium mounted on the external memory 13 to the main memory 12.

Effects brought about by representative aspects of the present invention disclosed in the present application will now be described.

In the case where the electric source of the information processing system is to be disconnected, application software under execution is stopped and then the service processor issues an order for disconnection of the electric source to the electric source control circuit. In the case where the electric source of the information processing system is controlled from a terminal device located in a remote place, therefore, it is possible to protect data existing on the information processing system and thereafter control the electric source.

In the case where supply of electric power from the main electric source stops during operation of the information processing system and the auxiliary electric source starts its operation, the terminal device located in the remote place is notified via the modems and the communication line that the auxiliary electric source has started its operation. Therefore, it is possible to monitor the electric source state of the information processing system from the terminal device located in the remote place.

In the case where electric power is supplied from the auxiliary electric source, application software under execution is stopped before all of the electric power supplying capability of the auxiliary electric source is exhausted. In the case where supply of electric power from the main electric source is stopped and the auxiliary electric source is operating, therefore, it is possible to protect data existing on the information processing system and stop the operation of the information processing system before the operation of the auxiliary electric source stops.

What is claimed is:

1. An information processing apparatus having an improved electric source control function, comprising:
   a main electric source for supplying operation electric power of said information processing apparatus;
   an auxiliary electric source, responsive to interruption of supply of operation electric power from said main electric source, to supply operation electric power of said information processing apparatus in place of said main electric source;
   a sensing circuit for sensing changeover of supply source of operation electric power to the auxiliary electric source and monitoring operation of the auxiliary electric source; and
   a control circuit for informing a different information processing apparatus of an electric power status of said auxiliary electric source.

2. An information processing apparatus according to claim 1, wherein said control circuit, responsive to said sensing circuit sensing changeover of supply source of operation electric power to the auxiliary electric source, terminates a program under operation, conducts shutdown processing, and thereafter terminates supply of electric power to said information processing apparatus.

3. An information processing apparatus according to claim 2, wherein said auxiliary electric source has a limited power supply time, and wherein when the supply time remaining during which said auxiliary electric source can operate has reached a predetermined value, said control circuit executes the shutdown processing and terminates supply of electric power.

4. An information processing apparatus according to claim 3, wherein as the predetermined value for the remaining supply time during which said auxiliary electric source can operate, a value of at least time required for the shutdown processing is preset.

5. An information processing apparatus according to claim 3, further comprising means for detecting a current value currently in use by said auxiliary electric source and for determining and outputting a predetermined time value according to the detected current value, wherein when the remaining supply time during which said auxiliary electric source can operate has reached said predetermined time value outputted from said outputting means, said control circuit executes the shutdown processing and terminates supply of electric power.

6. An information processing apparatus according to claim 5, wherein said auxiliary electric source has a limited power supply time, and wherein when the supply time remaining during which said auxiliary electric source can operate has reached a predetermined value, said control circuit executes the shutdown processing and terminates supply of electric power.

7. An information processing apparatus according to claim 6, wherein as the predetermined value for the remaining supply time during which said auxiliary electric source can operate, a value of at least time required for the shutdown processing is preset.

8. An information processing apparatus according to claim 6, further comprising means for detecting a current value currently in use by said auxiliary electric source and for determining and outputting a predetermined time value according to the detected current value, wherein when the remaining supply time during which said auxiliary electric source can operate has reached said predetermined time value outputted from said outputting means, said control circuit executes the shutdown processing and terminates supply of electric power.

9. An information processing apparatus according to claim 8, wherein said outputting means has a table determining, in association with said current value, an auxiliary electric source operation time indicating time during which said auxiliary electric source can operate and said predetermined time value indicating time when said information processing apparatus starts shutdown processing, and
wherein said outputting means outputs said predetermined time value in response to the detected current value by referring to said table.

10. An information processing apparatus according to claim 5, wherein said outputting means has a table determining, in association with said current value, an auxiliary electric source operation time indicating time during which said auxiliary electric source can operate and said predetermined time value indicating time when said information processing apparatus starts shutdown processing, and
wherein said outputting means outputs said predetermined time value in response to the detected current value by referring to said table.

11. An information processing apparatus according to claim 2, further comprising connection means for communicating with said different information processing apparatus via a communication line, wherein before executing shutdown processing, said control circuit notifies said different processing apparatus that the shutdown processing will be conducted.

12. An information processing apparatus according to claim 2, further comprising:
a main storage and an external storage, wherein data is saved in the external storage when supply of electric power to the information processing apparatus is terminated.

13. An electric source control method for an information processing apparatus, said information processing apparatus being connected to a different information processing apparatus located in a remote place via a communication line, said information processing apparatus having a main electric source for supplying operation electric power and an auxiliary electric source, said auxiliary electric source being responsive to interruption of supply of the operation electric power from said main electric source to supply operation electric power in place of said main electric source, said electric source control method comprising the steps of:
sensing changeover of supply source of operation electric power to the auxiliary electric source; and
monitoring operation of the auxiliary electric source.

14. An electric source control method according to claim 13, further comprising the steps of:
terminating a program under operation, saving data in external storage, and executing shutdown processing in response to sensing changeover of supply source of operation electric power to the auxiliary electric source; and
terminating supply of electric power to said information processing apparatus.

15. An electric source control method according to claim 14, further comprising the step of presetting a predetermined time value required for the shutdown processing,
wherein said auxiliary electric source has a limited power supply time; and
wherein said step of executing shutdown processing comprises the step of executing the shutdown processing when the supply time remaining during which said auxiliary electric source can operate has become said predetermined time value.

16. An electric source control method according to claim 11, further comprising the step of holding a table, said table specifying a plurality of predetermined time values with correspondence to current values now in use by said auxiliary electric source,
wherein said step of executing shutdown processing comprises the steps of detecting a current value now in use by said auxiliary electric source, consulting said table, and starting the execution of the shutdown processing when the predetermined time value corresponding to the detected current value has been reached.

17. An electric source control method according to claim 14, further comprising the step of notifying, before executing shutdown processing, said different processing system that the shutdown processing will be conducted.

18. An information processing apparatus, comprising:
a central processing unit for executing a program;
means connecting said information processing apparatus to a different information processing apparatus via a communication line;
a service processor for discriminating an order issued by said different information processing apparatus;
an electric source control circuit for controlling connection or disconnection of an electric source in response to an electric source connection or disconnection order issued by said service processor; and
an electric source unit for conducting connection or disconnection of an electric source in response to an electric source connection or disconnection order issued by said electric source control circuit;
wherein said service processor, upon discriminating an electric source disconnection order issued by said different information processing apparatus, issues a shutdown order to said central processing unit, saves data in external storage, terminates a program under execution effected by said central processing unit, and thereafter orders said electric source control circuit to disconnect the electric source; and wherein said electric source unit disconnects the electric source in response to an order issued by said electric source control circuit, thereby allowing said different information processing apparatus to control the electric source of said information processing apparatus.

19. An information processing apparatus according to claim 18, wherein said electric source unit comprises a main electric source for supplying operation electric power of said information processing apparatus, an auxiliary electric source, responsive to interruption of supply of operation electric power from said main electric source, to supply operation electric power of said information processing apparatus in place of said main electric source, and a sensing circuit for sensing changeover of supply source of electric power to the auxiliary electric source, and wherein said service processor orders said central processing unit to conduct shutdown processing in response to said sensing circuit sensing changeover to the auxiliary electric source.

20. An information processing apparatus according to claim 18, wherein said different information processing apparatus comprises means for attaching an electric source disconnection time to an electric source disconnection order signal and sending a resultant signal, and wherein said service processor determines whether the electric source disconnection order issued by said different information processing apparatus has a disconnection start time attached thereto, and if the electric source disconnection order has a disconnection start time attached thereto, said service processor outputs a shutdown processing order to said central processing unit when said disconnection start time has been reached.

21. An information processing apparatus according to claim 18, wherein said different information processing apparatus comprises means for adding an ID (identification) for identifying its own terminal device to the electric source disconnection signal, and wherein said service processor recognizes said ID, and when said ID is a preset and predetermined ID, said service processor outputs a shutdown order to said central processing unit in response to the electric source disconnection order.

22. An information processing apparatus according to claim 21, wherein said different information processing apparatus comprises means for attaching an electric source disconnection time to an electric source disconnection order signal and sending a resultant signal, and wherein said service processor determines whether the electric source disconnection order issued by said different information processing apparatus has a disconnection start time attached thereto, and if the electric source disconnection order has a disconnection start time attached thereto, said service processor outputs a shutdown processing order to said central processing unit when said disconnection start time has been reached.

23. An information processing apparatus, comprising:

a main electric source for supplying operation electric power to said information processing apparatus;

an auxiliary electric source, responsive to interruption of supply of operation electric power from said main electric source, to supply operation electric power to said information processing apparatus;

a service processor for discriminating an order issued by a different information processing apparatus, and an auxiliary electric source monitoring circuit for monitoring operation of said auxiliary electric source and notifying said service processor of the operation of said auxiliary electric source, wherein when supply of electric power conducted by said main electric source stops and supply of electric power conducted by said auxiliary electric source is started, said auxiliary electric source monitoring circuit notifies said service processor that operation of said auxiliary electric source has been started, and notifies the different information processing apparatus located in a remote place of an electric source state of said information processing apparatus.

24. A storage medium for storing a program code mounted on an information processing apparatus for running on said information processing apparatus, said information processing apparatus being connected to a different information processing apparatus located in a remote place via a communication line, said information processing apparatus having a main electric source for supplying operation electric power and an auxiliary electric source responsive to interruption of supply of the operation electric power from said main electric source to supply operation electric power in place of said main electric source, said storage medium comprising program codes corresponding to the following program modules:

step of sensing changeover of electric source supply;

step of terminating application program under operation, saving data in external storage, and executing shutdown processing in response to sensing of changeover to the auxiliary electric source; and step of terminating supply of electric power to said information processing apparatus.

25. A method for controlling an information processing apparatus by transmitting program codes to said information processing apparatus via a communication line, said program codes being of a program stored in a memory of an information processing apparatus and run on said information processing apparatus, said information processing apparatus being connected to a different information processing apparatus located in a remote place via a communication line, said information processing apparatus having a main electric source for supplying operation electric power and an auxiliary electric source responsive to interruption of supply of the operation electric power from said main electric source to supply operation electric power in place of said main electric source, said program codes corresponding to the following program modules:

step of sensing changeover of electric source supply;

step of terminating application program under operation, saving data in external storage and executing shutdown processing in response to sensing of changeover to the auxiliary electric source; and step of terminating supply of electric power to said information processing apparatus.

* * * * *